United States Patent Office 3,652,619
Patented Mar. 28, 1972

3,652,619
ORGANO-ZINC ALKANOLAMINE COMPLEX FOR STABILIZING VINYL HALIDE RESINS
Lawrence R. Jones, Terre Haute, Ind., assignor to Commercial Solvents Corporation
No Drawing. Filed Dec. 29, 1969, Ser. No. 888,804
Int. Cl. C07f 3/06
U.S. Cl. 260—429.9                              4 Claims

ABSTRACT OF THE DISCLOSURE

Stabilized polyvinyl halide compositions including co-polymers thereof, stabilized against heat degradation by incorporating therein from 1–10% by weight of a complex obtained by reacting an alkanolamine represented by the formula

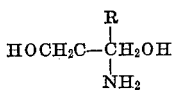

where R is methyl, ethyl or hydroxymethyl with zinc glutamate or zinc sulfate.

BACKGROUND OF THE INVENTION

This invention relates to stabilization of vinyl resins. In a particular aspect, this invention relates to the stabilization of halogenated vinyl resins against heat degradation by incorporating therein stabilizing amounts of metallo-organic complexes.

The problem of heat-stabilization of halogenated vinyl resins and co-polymers thereof to prevent discoloration and decomposition due to the effect of heat has long been a troublesome one to the industry. It is discussed by F. F. Holub et al., in U.S. Pat. 3,288,744, which is incorporated herein by reference thereto. It is known from this patent that tris(hydroxymethyl)aminomethane incorporated in such resins in proportions of 0.5–25% wt. based on the weight of the resins stabilize them to temperatures as high as 170° C. for as long as 2 hours. By comparison, unstabilized, plasticized polyvinyl chloride was quite dark after 1 hour at 150° C.

SUMMARY OF THE INVENTION

It is an object of the present invention to provide halogenated vinyl resins and co-polymers thereof stabilized against heat degradation.

It is another object of this invention to provide heat-stabilized compositions of halogenated vinyl resins and co-polymers thereof by incorporating therein certain organo-zinc complexes.

Other objects of this invention will be apparent to those skilled in the art from the disclosure herein.

It is the discovery of the present invention that polyvinyl halide polymers and co-polymers are stabilized against degradation by heat by incorporating therein a complex obtained by reacting an alkanolamine corresponding to the formula:

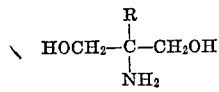

where R is methyl, ethyl or hydroxymethyl with zinc glutamate or zinc sulfate, in a ratio of from 1–2 moles of the alkanolamine to one of the zinc salt. These complexes are employed in polyvinyl halide compositions or co-polymers thereof in a proportion of from about 1–10% by weight based on the weight of the polyvinyl halide polymer.

DETAILED DISCUSSION

The alkanolamine-zinc salt complexes of the present invention are readily prepared by mixing the components in a mole ratio of from 1–2 of alkanolamine to one of zinc glutamate or zinc sulfate. The components are suspended in a small amount of water, e.g. about 1 part per 4–5 parts of solids, or an aqueous alcohol mixture; the mixture is warmed to about 60–80° C. until the solids dissolve and is then transferred to an evaporating dish and dried in a vacuum oven at about 50° C.

The alkanolamines useful in the practice of the present invention include 2-amino-2-methyl-1,3-propanediol, 2-amino-2-ethyl-1,3-propanediol, and preferably tris(hydroxymethyl)aminomethane. These compounds are available commercially and the usual commercial grades are suitable for the practice of this invention.

The zinc salts with which complexes of the foregoing alkanolamines are formed include zinc glutamate and zinc sulfate. Zinc sulfate is commercially available and the usual commercial-grade material is suitable for forming the alkanolamine complexes. Zinc glutamate is readily prepared by reacting a soluble zinc salt with glutamic acid in a ratio of one mole of zinc per mole of acid. Zinc glutamate is formed as a by-product in the manufacture of glutamic acid as disclosed by J. A. Frump in U.S. Pat. 3,287,572. The product so obtained is suitable for the practice of the present invention.

Broadly, the invention relates to the heat stabilization of halogen-containing resinous compositions produced by halogenating vinyl resins or by polymerizing compositions produced by halogenating vinyl resins or by polymerizing compositions comprising a vinyl (including vinylidene) halide with or without other co-polymerizable compounds. The vinyl halide concerned with is typically and preferably vinyl chloride, although the other halides such as the bromide, iodide and fluoride are also contemplated. Among such compositions are (1) halogenated, e.g. chlorinated polyethylene, the polyvinyl halides, such as for example, polyvinyl chloride, polyvinyl bromide, polyvinylidene fluoride, neoprene, polyvinyl fluoride, etc.; (2) vinyl resins produced by the conjoint polymerization of a vinyl halide, e.g. vinyl chloride, and a vinyl ester of a lower saturated aliphatic monocarboxylic acid, e.g., vinyl acetate (such vinyl chloride-vinyl acetate copolymers being available under the trade name of Bakelite resins (trademark of Union Carbide) wherein the vinyl chloride component is present in a preponderant amount), a vinyl propionate, vinyl butyrate, vinyl hexoate, vinyl acetobutyrate, vinyl chloroacetate, vinyl chloropropionate, etc., it being obvious from the foregoing examples that the term "lower saturated aliphatic monocarboxylic acid" embraces ones containing at most six carbon atoms; (3) vinyl resins produced by the conjoint polymerization of a vinyl halide and an acrylic compound, e.g., the co-polymers of vinyl chloride with, for example, ethyl methacrylate, methyl methacrylate, benzyl or chlorobenzyl acrylate, methyl chloroacrylate, etc.; (4) co-polymers of vinyl halide, e.g. vinyl chloride, and a vinylidene halide, e.g., vinylidene chloride; and (5) many other vinyl resin co-polymers, such as the co-polymers of three-component systems, for example, vinyl chloride, vinyl acetate and ethyl methacrylate, etc. As will be understood by those skilled in the art, other multi-component co-polymers may be used, the only requirement being that at least one of the components is a vinyl halide. Further methods of preparation of the vinyl halide resins employed herein and additional examples of vinyl halide co-polymers which may be stabilized with the alkanol-amine-zinc complexes of this invention may be found in, e.g., D'Aleio Pats. 2,378,753, issued June 19, 1945, and 2,299,740, issued Oct. 27, 1942.

The halogenated vinyl resins may have incorporated therein various plasticizers such as tricresyl phosphate, dibutyl phthalate, di-(2-ethylhexyl) phthalate, dibutyl sebacate, di-(2-ethylhexyl) sebacate, di-(2-ethylhexyl) azelate, epoxidized soy-bean oil, etc. The amount of plasticizer which may be used may be varied from about ½ to 2 parts, by weight, of the plasticizer to one part of the vinyl halide resin.

Various fillers may also be added in amounts ranging from about 10 to 200 percent or more, by weight, based on the total weight of the filler and the halogenated vinyl resin. Among such fillers may be mentioned carbon black, barytes, zinc oxide, clay, wood flour, and other pigments and fillers commonly used in the rubber and plastics industries.

Various means well known to the art may be used for incorporating the stabilizer of this invention into the resinous compositions, among these being the one disclosed in U.S. Pat. 3,288,744 wherein sheeting on differential rolls (or mill rolls) was employed.

The invention will be understood more fully by reference to the following specific examples. It is understood that the examples are presented for the purposes of illustration only and are not intended as a limitation of the invention.

EXAMPLE 1

A complex of tris(hydroxymethyl)aminomethane (TA) with zinc glutamate was prepared by dissolving 24 g. (0.2 mole) of TA in 100 ml. of methanol and 50 ml. of water. Then 21 g. (0.085 mole) of zinc glutamate having 1 mole water of crystallization (ml. wt. 246) was added and the mixture was heated at about 65° C. until the solids dissolved. The methanol and water were then evaporated to recover a TA-zinc glutamate complex. In a similar manner, TA was reacted with zinc glutamate in a 1:1 mole ratio to produce a complex. The structure of these compounds has not been determined and they are denoted "a complex" as a matter of convenience. It is not intended that the invention be limited by the use of such term, however.

A milled sheet was prepared by mixing 100 parts by weight of polyvinyl chloride (Geon 102 EPFI, Suspension type manufactured by B. F. Goodrich Chemical Co.), 40 parts di-(2-ethylhexyl)phthalate, 5 parts of epoxized soya oil plasticizer (Plastolein 9232, manufactured by Emery Industries) and 2 parts of the stabilizer. The ingredients were hand mixed in a beaker, milled for 5 min. on a 6" x 13", two-roll mill, heated to 325° F. The mixture was formed into a 35–40 mil thick sheet in a period of about 4 minutes, cooled, cut in 1" squares and placed in a rotating-shelf, preheated oven at 350° F. (176° C.). The heating was continued until inspection showed that the sheet had darkened; the time required indictaed the effectiveness of the stabilizer. The experiment was repeated using (a) a control without stabilizer, (b) tris(hydroxymethyl)aminomethane (TA) as the stabilizer, (c) zinc glutamate as the stabilizer, (d) a complex of TA and zinc glutamate in a 1:1 mole ratio, (e) a complex of TA and zinc glutamate in a 2:1 mole ratio, and (f) a physical mixture of TA and zinc glutamate. The following results were obtained:

Stabilizer: Time Stabilized at 350° F., hrs.
(a) None _____ 0.5
(b) TA _____ 2
(c) Zinc glutamate _____ 1.75
(d) TA-zinc glutamate (1:1) _____ 4
(e) TA-zinc glutamate (2:1) _____ 4.5
(f) TA-zinc glutamate mixture _____ 2.5

EXAMPLE 2

The experiment of Example 1 was repeated except that zinc sulfate was substituted for zinc glutamate. Complexes were obtained wherein the TA and zinc sulfate were in a 1:1 and a 2:1 mole ratio respectively.

The test procedure of Example 1 was repeated except that zinc sulfate was substituted for zinc glutamate in (c); the TA-zinc sulfate complex in a 1:1 mole ratio (d), and in a 2.1 mole ratio (e), were substituted for the 1:1 and 2:1 TA-zinc glutamate complexes respectively. The following results were obtained.

Stabilizer: Time Stabilized at 350° F., hrs.
(a) None _____ 0.5
(b) TA _____ 2
(c) ZnSO$_4$ _____ 1.25
(d) TA·ZnSO$_4$ _____ 1
(e) (TA)$_2$·ZnSO$_4$ _____ 3

EXAMPLE 3

The experiment of Example 1 is repeated except that 2-amino - 2 - ethyl-1,2-propanediol, (hereinafter denoted AEPD) is substituted for TA in a 1:1 and a 2:1 mole ratio with zinc glutamate. The products obtained thereby stabilize a vinyl halide resin against heat when incorporated therein.

EXAMPLE 4

The experiment of Example 1 is repeated except that 2 - amino - 2-methyl - 1,3-propanediol is substituted for AEPD in a 1:1 and in a 2:1 mole ratio. The products obtained thereby are effective heat stabilizers when incorporated in vinyl halide resins.

EXAMPLE 5

The experiment of Example 4 is repeated except that 2-amino-2-methyl-1,3-propanediol is substituted for AEPD. The products obtained thereby are effective heat stabilizers when incorporated in vinyl halide resins.

I claim:
1. A stabilizing composition for vinyl halide resin compositions consisting essentially of an organozinc complex of an alkanolamine corresponding to the formula:

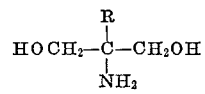

where R is methyl, ethyl or hydroxymethyl, with zinc glutamate or zinc sulfate in a mole ratio of about 1–2 moles of said alkanolamine to 1 of said zinc glutamate or zinc sulfate.

2. The composition of claim 1 wherein said complex is tris(hydroxymethyl)aminomethane and zinc glutamate in a 1:1 mole ratio.

3. The composition of claim 1 wheerin said complex is tris(hydroxymethyl)aminomethane and zinc glutamate in a 2:1 mole ratio.

4. The composition of claim 1 wherein said complex is tris(hydroxymethyl)aminomethane and zinc sulfate in a 2:1 mole ratio.

References Cited

UNITED STATES PATENTS
3,288,744  11/1966  Holub et al.

OTHER REFERENCES
Chemical Abstracts, vol. 52, 8271a (1958).
Chemical Abstracts, vol. 54, 2787c (1960).
Chemical Abstracts, vol. 57, 4294b (1962).
Chemical Abstracts, vol. 63, 12649f (1965).
Chemical Abstracts, vol. 66, 19761h (1967).

TOBIAS E. LEVOW, Primary Examiner

H. M. S. SNEED, Assistant Examiner

U.S. Cl. X.R.
260—45.75 R

PO-1050
(5/69)

UNITED STATES PATENT OFFICE
CERTIFICATE OF CORRECTION

Patent No. 3,652,619        Dated March 28, 1972

Inventor(s)     Lawrence R. Jones

It is certified that error appears in the above-identified patent and that said Letters Patent are hereby corrected as shown below:

Column 2, line 27 - "3,287,572" should be --3,278,572--
Column 2, line 71 - "D'Aleio" should be --D'Alelio--
Column 3, line 32 - "ml." should be --mol.--
Column 3, line 54 - "indictaed" should be --indicated--
Column 4, line 53 - "wheerin" should be --wherein--

Signed and sealed this 25th day of July 1972.

(SEAL)
Attest:

EDWARD M. FLETCHER, JR.
Attesting Officer

ROBERT GOTTSCHALK
Commissioner of Patents